(12) United States Patent
Reichelt

(10) Patent No.: US 6,386,787 B1
(45) Date of Patent: May 14, 2002

(54) BALL JOINT WITH COMPRESSED PRESSURE SHELL

(76) Inventor: Helmut Reichelt, Suedstrasse 25, 73770 Denkendorf (DE)

( * ) Notice: Subject to any disclaimer, the term of this patent is extended or adjusted under 35 U.S.C. 154(b) by 0 days.

(21) Appl. No.: 08/689,681

(22) Filed: Aug. 13, 1996

Related U.S. Application Data

(63) Continuation of application No. 08/376,368, filed on Jan. 23, 1995, now abandoned.

(30) Foreign Application Priority Data

Jan. 21, 1994 (DE) .......................................... 44 01 639

(51) Int. Cl.⁷ ............................................... F16C 11/00
(52) U.S. Cl. ........................ 403/140; 403/124; 403/125; 403/133; 403/135; 403/137
(58) Field of Search ................................ 403/124, 125, 403/132, 133, 135, 137, 138, 140, 122, 126, 130, 134, 141, 143

(56) References Cited

U.S. PATENT DOCUMENTS

| | | | |
|---|---|---|---|
| 2,917,334 A | | 12/1959 | Baker .......................... 403/140 |
| 3,363,921 A | * | 1/1968 | Gottschald .............. 403/126 X |
| 3,375,027 A | * | 3/1968 | Ulderup ...................... 403/126 |
| 3,401,962 A | | 9/1968 | Scheublein, Jr. et al. ... 403/126 |
| 3,494,644 A | * | 2/1970 | Gottschald .................. 403/126 |
| 3,506,288 A | * | 4/1970 | Gottschald .................. 403/126 |
| 3,545,797 A | | 12/1970 | Korecky ........................ 403/39 |
| 3,944,376 A | * | 3/1976 | Hata ............................ 403/132 |
| 4,230,415 A | * | 10/1980 | Scheerer ..................... 403/122 |
| 4,259,027 A | * | 3/1981 | Hata ....................... 403/138 X |
| 4,577,987 A | * | 3/1986 | Buhl et al. .................. 403/133 |
| 4,790,682 A | * | 12/1988 | Henkel ....................... 403/140 |
| 4,875,794 A | * | 10/1989 | Kern, Jr. ..................... 403/132 |
| 4,921,368 A | * | 5/1990 | Busse et al. ................ 403/134 |
| 4,995,754 A | * | 2/1991 | Ishii ....................... 403/138 X |
| 5,509,748 A | * | 4/1996 | Idosako et al. ............. 403/133 |
| 5,551,791 A | * | 9/1996 | Schneider ............... 403/138 X |

FOREIGN PATENT DOCUMENTS

| | | | | |
|---|---|---|---|---|
| DE | 3018187 | * | 11/1981 | ................. 403/122 |
| EP | 0 213 314 | | 7/1986 | |
| EP | 0 345 452 | | 4/1989 | |
| FR | 2 250 042 | | 5/1975 | |
| GB | 861976 | | 3/1961 | |
| GB | 2 038 928 | | 7/1980 | |
| JP | 49-10780 | | 3/1974 | |
| JP | 62-297526 | | 12/1987 | |
| JP | 63-30618 | | 2/1988 | |
| JP | 63-72913 | * | 4/1988 | ................. 403/135 |
| JP | 1-100921 | | 7/1989 | |

* cited by examiner

*Primary Examiner*—B. Dayoan
*Assistant Examiner*—Andrea Chop
(74) *Attorney, Agent, or Firm*—Crowell & Moring LLP

(57) ABSTRACT

A supporting joint having a casing and a ball pin held therein comprises, on the pin side, a support having a bearing shell and, oppositely to the pin, a pressure shell. A cutout is provided in the central region of the pressure shell. On the rear side the pressure shell is provided with a cover having a support surface. Referred to the installed joint, the thickness of the pressure shell in a central support region, measured in the uninstalled state, is greater than the distance between the ball and the support surface of the cover.

2 Claims, 4 Drawing Sheets

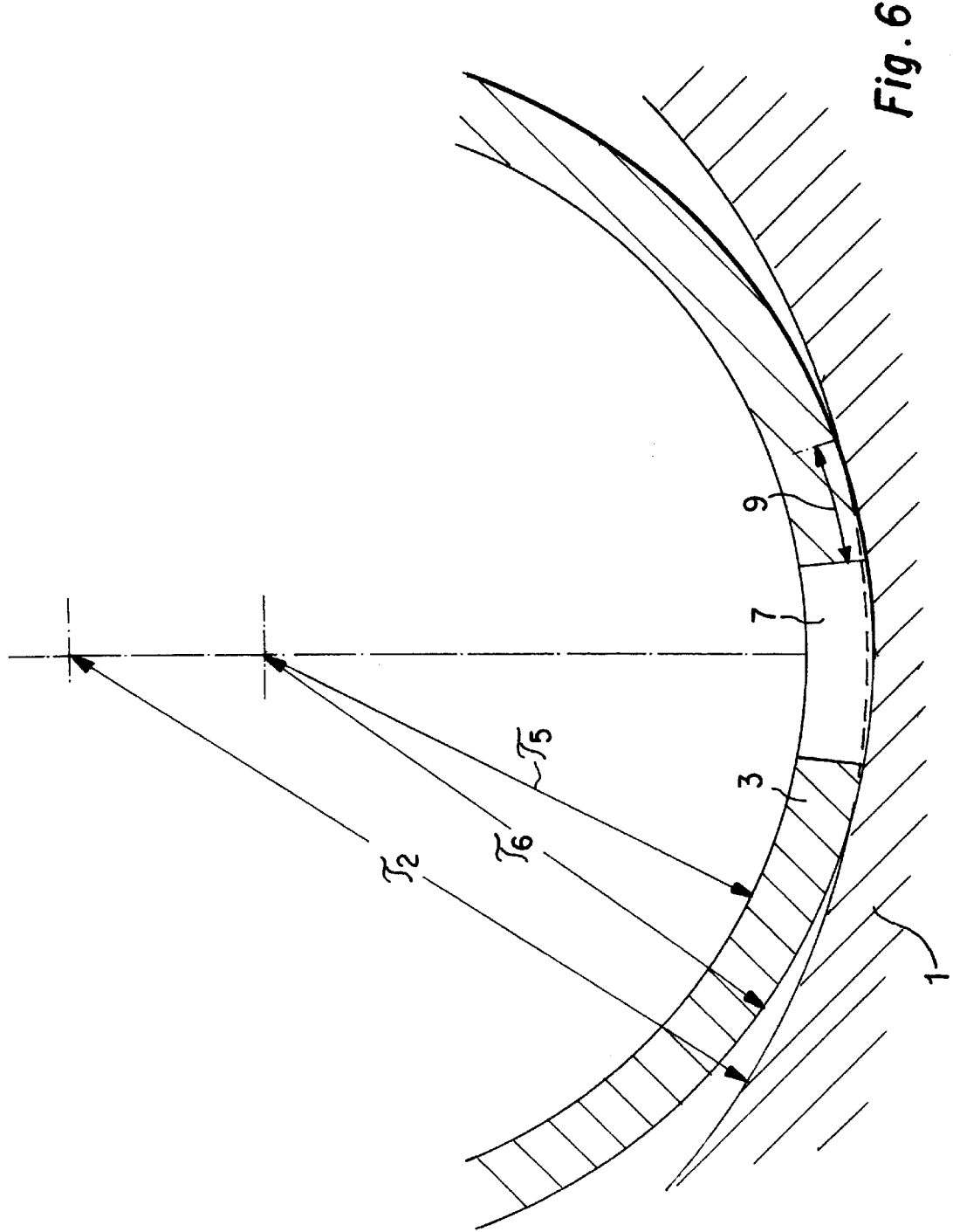

US 6,386,787 B1

BALL JOINT WITH COMPRESSED PRESSURE SHELL

This application is a continuation of application Ser. No. 08/376,368, filed on Jan. 23, 1995, now abandoned.

BACKGROUND AND SUMMARY OF THE INVENTION

The present invention relates to a supporting joint of the kind having a casing and a ball pin and ball held in the casing by a support comprising, on the ball pin side, a shell-shaped receptacle, oppositely to the ball pin a pressure shell having a cutout in a central support region thereof, and on a rear side relative to the pressure shell a cover supporting the pressure shell and having a curved support surface corresponding substantially to a curvature of the ball.

Supporting joints are known and can, for example, be installed in double wishbone axles having spring-loaded lower transverse links. Because of tire contact load, forces acting at right angles to the road surface are produced in such arrangements and, for example, subject the supporting joint to tensile loads.

Because such loads, i.e. the aforementioned tensile forces, are not always equal in magnitude, devices which compensate for the resulting play must be provided in the supporting joint interior. The play compensation component used is usually one of a deformable material, generally a plastic. This component, which can be configured as a pressure shell, lies against the supporting joint cover, against which it is pressed by the ball of the supporting joint, and also lies against the casing wall of the supporting joint. Because of this two point contact, that is, viewed spatially, on two annular surfaces, the pressure shell can deform only very slightly or not at all to compensate for play. Thus, either the play compensation is inadequate or the supporting joint can be moved only with great difficulty because the pressure shell has dimensions such that very high frictional moments occur between the pressure shell and the ball of the supporting joint.

Furthermore, the play compensation component, namely the pressure shell, adapts itself to the shape of the casing cover. This process takes place in particular on the outer periphery of the pressure shell. Hence, when the supporting-joint casing is rolled-in, the pressure shell presses against the ball over a large radius. The frictional moment of the joint or the frictional moment tolerance is thereby negatively influenced.

When the cover is pressed in, a wedging action additionally occurs in the region between the pressure shell and the ball. In the additional event of pressure loading, an axial softness or elasticity can still occur between the ball and the casing or the support because, in the inner region with a smaller radius, a clearance exists between the cover and the pressure shell. Axial softness in the joint is, however, impermissible, because damage to the supporting joint must be verified through the absence of play.

In addition, no large fluctuations of frictional moment should occur in the supporting joint, so as to enable the latter to move with, as far as possible, defined friction.

In U.S. Pat. No. 3,401,962 a joint has a rotatable, partly spherical bearing pin. An intermediate plate lies on the bearing pin and, together with the bearing pin, can be turned relative to a bearing part or directly relative to a bearing part. The bearing part thus constitutes a stationary part relative to the rotatable bearing pin and, where applicable, also relative to the intermediate plate. To avoid direct contact between the bearing part and the bearing pin or the intermediate plate, and to ensure contact only through 0-rings, the radius of the bearing shell is larger than the radius of the bearing pin. The resulting radius serves as a contactless lubricant chamber.

An object of the present invention is to provide a supporting joint which has the greatest possible insensitivity to tolerances without requiring adjustment.

This object has been achieved in accordance with the present invention by providing that referred to an installed state of the supporting joint, the thickness of the pressure shell in the central support region, measured in an uninstalled state of the supporting joint, is greater than a distance between the ball and the support surface of the cover.

Through the selection of the pressure shell thickness, in accordance with the present invention, which thickness in the uninstalled state is greater than the distance between the ball and the support surface of the cover, it is ensured in a simple manner, by pressing the pressure shell, that on installation the joint is free from play and that the frictional moments of the joint or the frictional moment tolerances are not negatively influenced. Thus, the supporting joint can be moved with as far as possible defined friction. The pressure shell material displaced by the pressing can then escape into the central cutout.

BRIEF DESCRIPTION OF THE DRAWINGS

These and other objects, features and advantages of the present invention will become more readily apparent from the following detailed description when taken in conjunction with the accompanying drawings wherein:

FIG. 6 is a partial cross-sectional view of the supporting joint according to the present invention showing the thickness of the pressure shell, measured in the uninstalled state, being greater than a distance between the ball and support surface in the installed state, whereby the cover has a radius, in the central support region, in the preinstalled state, greater than the radius of the adjacent pressure shell with the radii becoming equal in the installed state of FIG. 2.

DETAILED DESCRIPTION OF THE DRAWINGS

Figure 1:
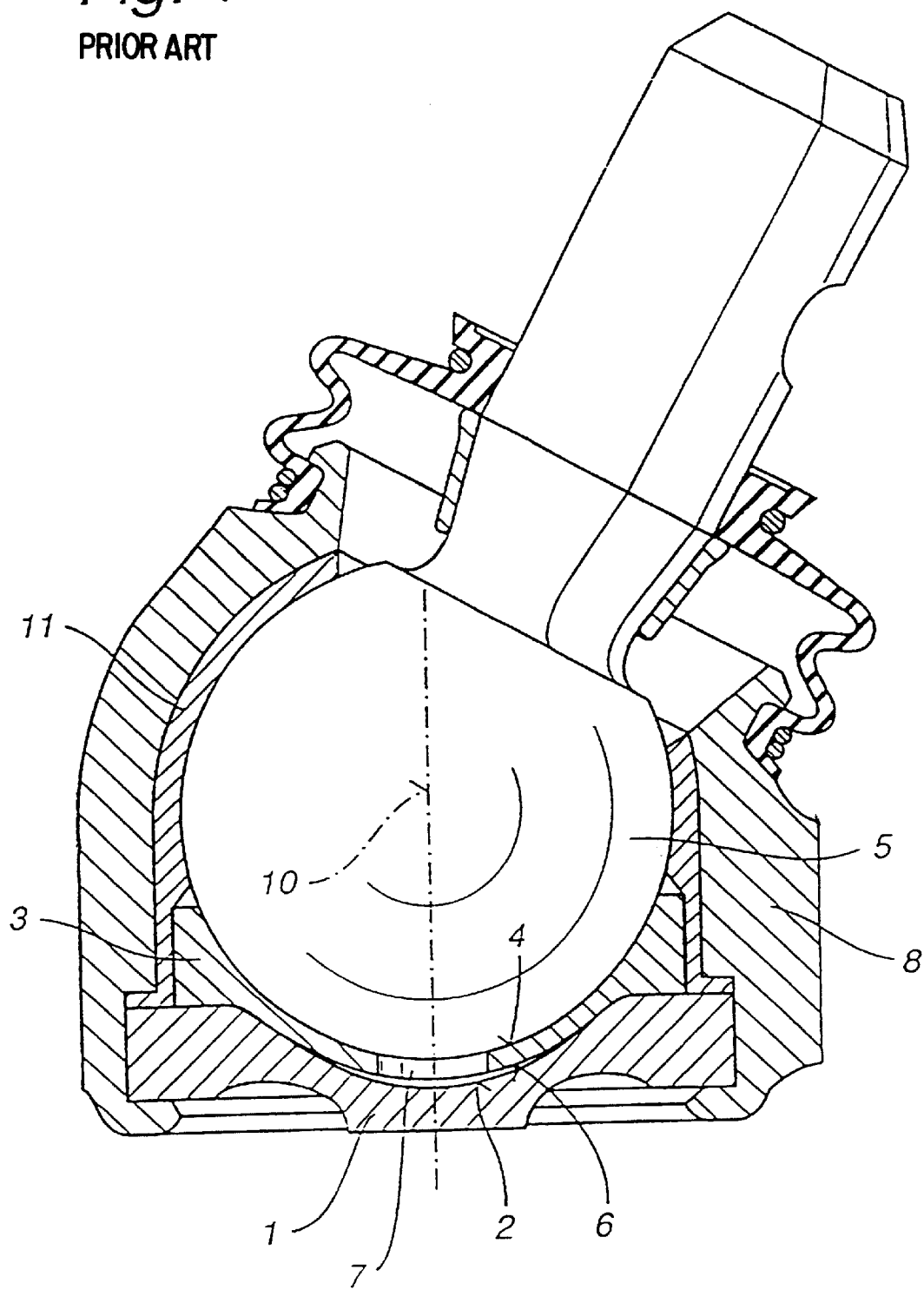
FIG. 1 is a partial cross-sectional view through a prior art supporting joint.

The prior art supporting joint illustrated in FIG. 1 has, on its side facing the interior of the supporting joint, a cover 1 which has a dome-shaped inner wall 2 provided with a support surface. A pressure shell 3 having a dome shape 4 lies between the cover 1 and a ball 5 of a ball pin. On its outer side, that is to say on its side directed towards the cover 1, the pressure shell 3 has a spherical or curved surface 6 against which, after the installation of the supporting joint, the dome-shaped inner wall 2 of the cover 1 partly lies, thus forming a support surface for the pressure shell 3. The pressure shell 3 has a central bore or cutout 7.

The ball pin, including the ball 5, is supported in a casing 8 surrounding the ball pin, on one hand, by a shell-shaped receptacle 11 and, on the other hand, by a support surface of the pressure shell 3. The curvature of the pressure shell 3 on the side facing the ball 5 is adapted to the curvature or radius of the ball 5. The center line of the supporting joint is designated by the numeral 10.

In this prior art embodiment, the radii of the ball 5, the pressure shell 3 and the cover 1 correspond or are coaxial to one another, and the thickness of the pressure shell 3 corresponds as a practical matter to the distance between the inner wall 2 of the cover 1 and the surface of the ball 5. Consequently, with an increasing load the support region moves into a radially outer annular zone near the edge of the cover 1, with a resulting correspondingly large friction radius and high frictional moment. As can be seen in FIG. 1, a situation may then even arise in which a clearance is formed, in the radially inner region, between the outside diameter of the pressure shell 3, i.e. the surface 6, and the inner wall 2 of the cover 1. The frictional moment in the known supporting joint is thus tolerance dependent.

Figure 2:
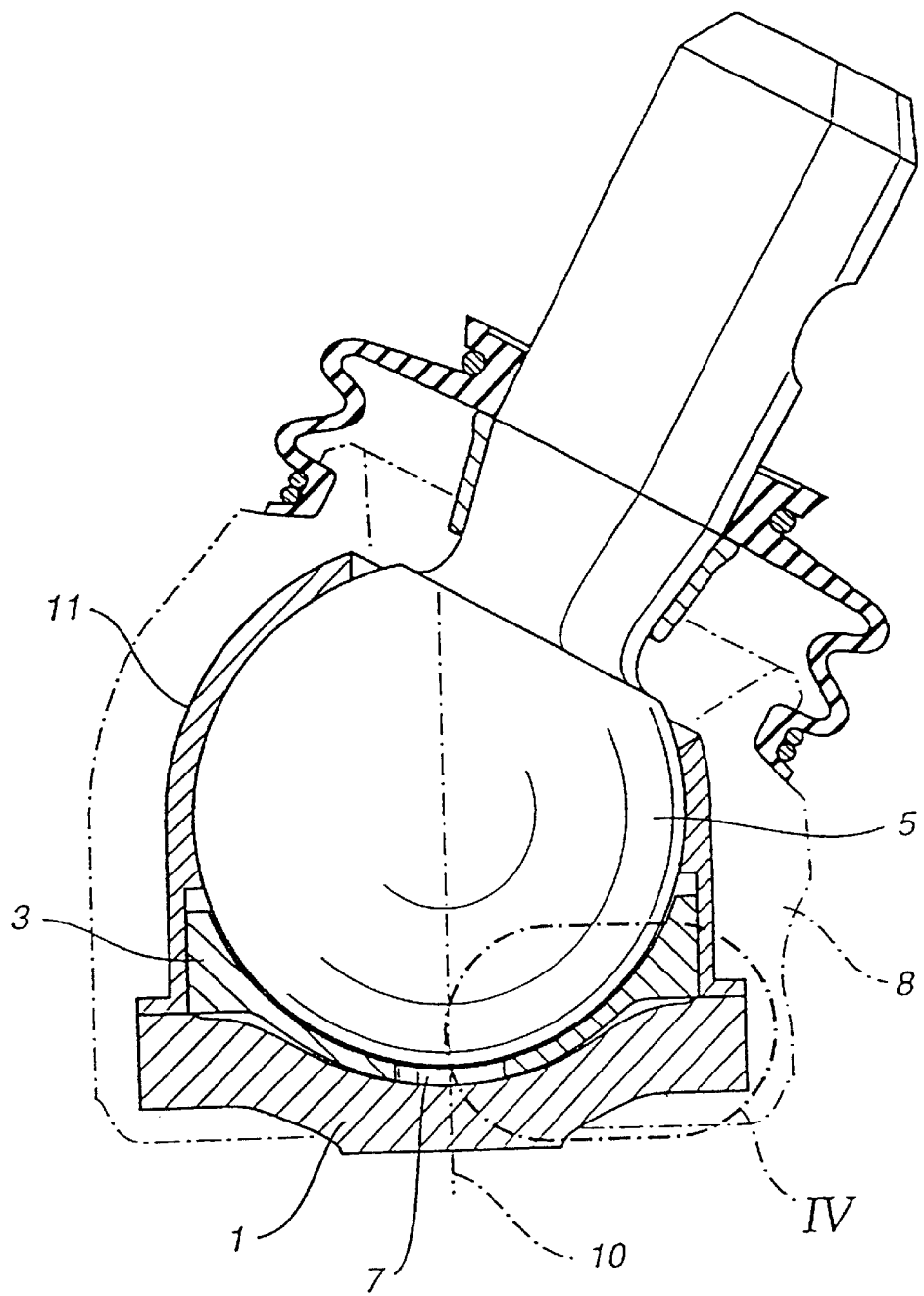
FIG. 2 is a partial cross-sectional view through a supporting joint according to the present invention.
Figure 3:
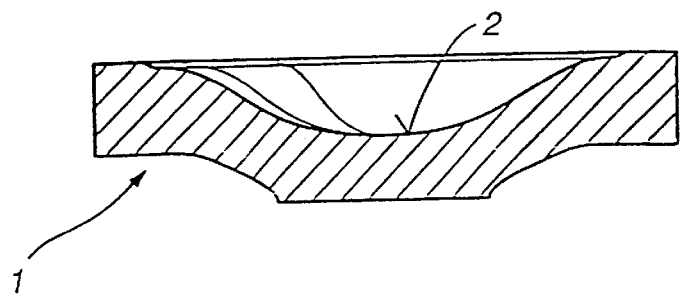
FIG. 3 is a sectional view through the cover of a supporting joint according to the present invention.
Figure 4:
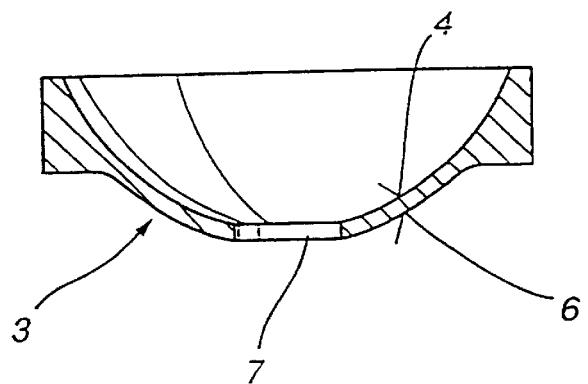
FIG. 4 is a sectional view through the pressure shell of a supporting joint according to the present invention.
Figure 5:
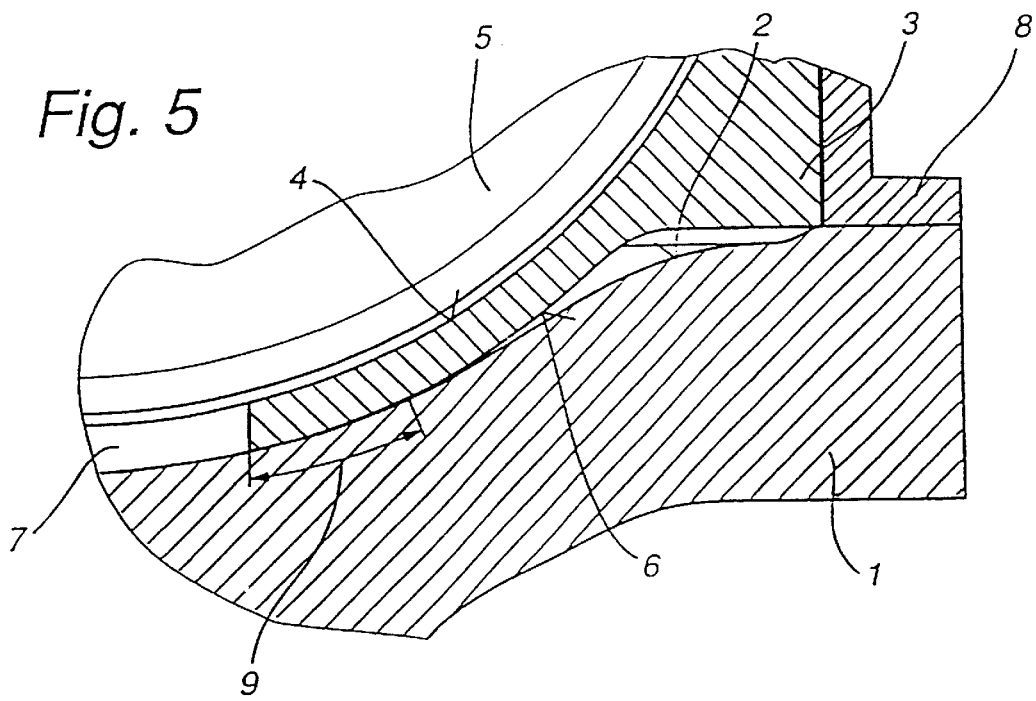
FIG. 5 is a view, drawn on a larger scale, of the detail "IV" in FIG. 2.

In FIG. 2, and particularly in the enlarged illustrations in FIGS. 3 to 5, the solution to the foregoing problem of tolerance dependence according to the present invention is now illustrated. The pressure shell 3 is made of a deformable plastic material, so that it can deform under load and no damage can be caused by excessively high tensions in the material. In the uninstalled state the pressure shell 3 has, at least in the intended overlap or support region between the pressure shell 3 and the cover 1, a thickness greater than the distance between the ball 5 and the inner wall of the cover 1 when the supporting joint is in the installed state. The "overlap or support" region is the region in which the pressure shell 3 lies with its curved surface 6 against the inner wall 2 of the cover 1. In FIG. 5 this support region is designated by the numeral 9 and lies in the radially inner region in relation to the center line 10.

The radius of curvature of the cover 1, at least in the intended support region 9, is greater than the outside radius of the pressure shell 3. That is, the inner wall of the cover 1 has a flatter curvature. As a result, in the installation of the supporting joint, the pressure shell 3 undergoes pressing in the interior region, with the material being substantially distributed into the central cutout 7. Thus, the support region 9 is formed in the radially inner region in the form of a wedge-shaped zone, with the wedge decreasing radially outwards.

In FIG. 5 the length of the support region 9 is marked by arrows. Tolerance compensation is thus achieved in a simple manner. When the ball 5 has its intended diameter, the wedge-shaped zone of the support region 9, i.e. the zone designated by the arrows, is very small. With a larger ball 5, the support region is necessarily somewhat larger, but it remains in the region of a low friction radius, by which is meant the distance between the wedge-shaped zone and the center line 10 of the supporting joint. Fundamentally, the friction radius nevertheless remains relatively small and is not situated, as is the case in the prior art of FIG. 1, in the radially outer region under heavy load.

In the embodiment according to FIGS. 2 to 5, higher loads are thus always taken in the central region. The friction radius therefore also remains substantially the same in dependence on load and independently of tolerances, and the same is thus also true of the frictional moment. The load corresponds to a corresponding prestress on the basis of dimensional tolerances.

As already mentioned above, the central cutout 7 makes it possible for material from the pressed pressure shell 3 to migrate into this region. In other words, the pressure shell 3 is prevented from having to yield radially outwards, which would lead to a corresponding increase of the friction radius and thus to a corresponding fluctuation in the frictional moment. Although forces which occur are distributed increasingly further outwards, the amount of force acting in the outward direction also declines because the force becomes increasingly smaller as the overlap or support region 9 with a diminishing wedge-shaped zone becomes smaller. Consequently, there are no major effects on the frictional moment tolerance in the event of relatively large overlap or tolerance errors.

The formation of the wedge-shaped support region in the inner region can be achieved in two different ways in respect of the differences in radii between the pressure shell and the cover, namely:

(a) As illustrated in FIGS. 2 to 5, the radius of the inner wall of the cover is greater or flatter. In a conventional joint having a ball, a normal pressure shell is used, and the cover 1 is correspondingly modified in respect of a correspondingly flatter shape of its inner wall. The center of the radius of the cover is offset relative to the center of the ball. Only the two radii of the pressure shell 3 have the same center as the ball 5.

(b) The inner wall 2 of the cover 1 lies concentrically to the ball 5. In this case, however, the thickness of the pressure shell 3 must then be varied in order to obtain the support surface having the wedge shape in the inner region. Through a corresponding modification of the radius, the pressure shell 3 is now made thicker in the inner region. Consequently, in the installation process, the pressure shell 3 is likewise pressed into a wedge shape in the middle, and on the outside the clearance between the pressure shell 3 and the cover 1 is retained.

The solution according to the invention can thus be achieved, on one hand, from the pressure-shell side by a thicker formation in the inner region or, alternatively, from the cover side through a flatter radius of the inner wall.

The supporting joint according to the present invention is installed by first inserting the bearing shell or support 11 into the casing 8, whereupon the ball 5 is inserted. The pressure shell 3 is thereupon laid against the ball 5 and the cover 1 is applied against the casing 8, whereupon, after a pressing operation, the outside radius of the pressure shell 3 corresponds to the radius or the curvature of the inner wall 2 of the cover 1 in the support region 9. The cover 1 is fastened to the casing 8 by flanging over a projecting edge of the casing 8, so that no further fastening and adjusting devices are required for the installation of the supporting joint according to the present invention.

In FIG. 6, the thickness of the pressure shell 3 is defined by $r_6$-$r_5$ for the pre-installed (or uninstalled) state, and the radius of the cover 1 in the central region thereof is designated by $r_2$. The dash line shows the outer surface of the cover 1 before installation of the pressure shell 3. As a result of the latter, in the installed state shown in FIG. 2, the radii $r_2$ and $r_6$ become equal as a result of pressing of the pressure shell 3 in the central region of the cover 1.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A supporting joint having a casing, a ball pin and ball held in the casing by a support comprising a shell-shaped receptacle, oppositely to the ball pin a pressure shell having, in an uninstalled state, a curved surface facing the ball immediately adjacent a cutout in a central support region thereof, and on a rear side relative to the pressure shell, a cover supporting the pressure shell and having a curved support surface in the central support region corresponding substantially to a curvature of the ball, wherein the thickness of the pressure shell in the central support region, measured in the uninstalled state of the supporting joint, is greater than a distance between the ball and the support surface of the cover so as to form a wedge-shaped zone in an installed state, wherein radially outwardly, relative to the pressure shell, the distance between the ball and the support surface of the cover exceeds the thickness of the pressure shell.

2. The supporting joint according to claim 1, wherein, in the uninstalled state of the supporting joint, the cover, in the central support region, has a radius greater than an outside radius of the adjacent pressure shell and, in the installed state of the supporting joint, the radii are equal in magnitude.

* * * * *